_United States Patent_ [19]

Jorgensen

[11] 3,863,953
[45] Feb. 4, 1975

[54] INDUSTRIAL TRAILER STEERING MECHANISM

[76] Inventor: David F. Jorgensen, 1616 Huntington Dr., South Pasadena, Calif. 91030

[22] Filed: Oct. 5, 1973

[21] Appl. No.: 404,109

[52] U.S. Cl.................. 280/444, 280/103, 280/419
[51] Int. Cl............................................ B62d 13/04
[58] Field of Search.... 280/419, 408, 103, 443–445, 280/426, 47.11

[56] References Cited
UNITED STATES PATENTS

| | | |
|---|---|---|
| 2,235,044 | 3/1941 | Ronning............................ 280/47.11 |
| 2,235,045 | 3/1941 | Ronning............................ 280/47.11 |
| 2,673,091 | 3/1954 | Planalp.............................. 280/103 |

FOREIGN PATENTS OR APPLICATIONS

| | | | |
|---|---|---|---|
| 392,289 | 11/1965 | Switzerland......................... 280/103 |
| 586,669 | 1/1925 | France............................. 280/47.11 |
| 73,274 | 3/1948 | Norway............................ 280/47.11 |

Primary Examiner—Leo Friaglia
Attorney, Agent, or Firm—Whann & McManigal

[57] ABSTRACT

A wheeled trailer vehicle for coupling connection with a pulling vehicle of a trackless train in which a generally rectangular platform is supported in one arrangement by two castors at the rear corners of the platform and in another arrangement by four castors at the front and rear corners of the platform. A pivoted pulling tongue at the forward end of the platform is connected through flexible members with the two rear castors so as to impart guiding swinging movements thereto in response to the lateral pivotal movements of the forward end of the pulling tongue. In the case of the four castor arrangement, crossbar means connect the tongue with the forward end castors so as to impart guiding movements thereto in an opposite direction to the guiding movements of the rear end castors, and in a modified form flexible members connect the two rear end castors with the two forward end castors in lieu of the crossbar means.

19 Claims, 6 Drawing Figures

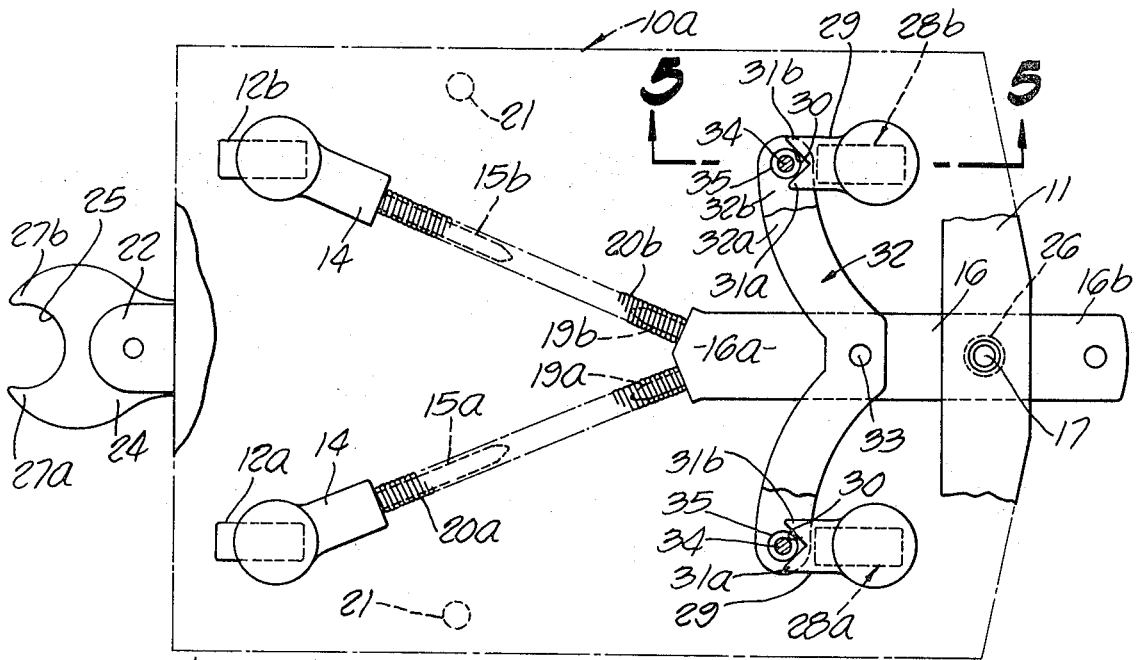
FIG. 4.
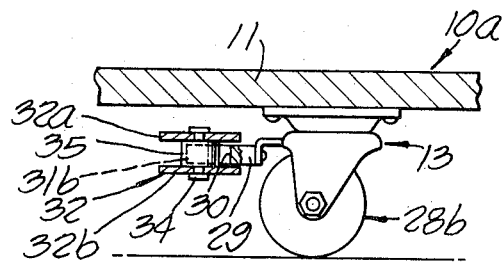
FIG. 5.
FIG. 6.
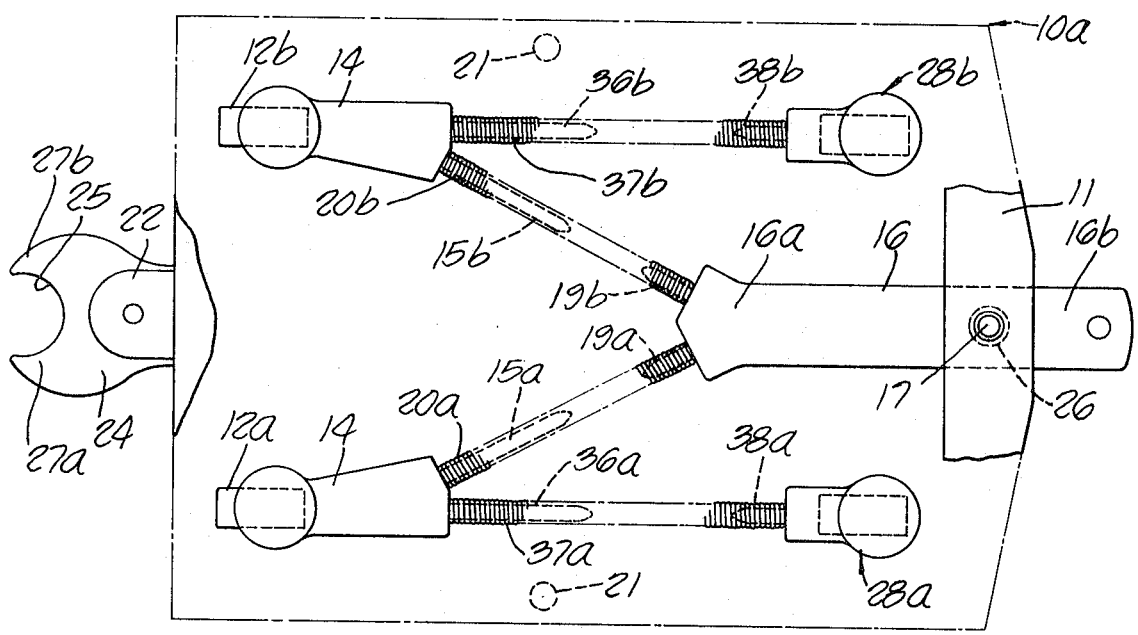

INDUSTRIAL TRAILER STEERING MECHANISM

PRIOR ART

In the prior art, there are a number of wheeled trailer vehicle arrangements for industrial use in trackless trains and the like. The closest art known to applicant are the following patents:

1,599,420—Sept. 14, 1926
1,752,638—Apr. 1, 1930
3,151,881—Oct. 6, 1964
3,294,417—Dec. 27, 1966
3,313,556—Apr. 11, 1967
3,366,398—Jan. 30, 1968

BACKGROUND OF THE INVENTION

The present invention relates generally to the field of wheel supported trailers.

Heretofore, two and four wheeled trailers have been generally known and utilized for coupled connection to form trackless trains for the transport of goods and materials in industrial plants, warehouses, and the like.

In such uses, it has been found that trailers having platforms mounted on castors or wheels which could swivel freely about a vertical axis are not entirely suitable under operating conditions which require short or tight turning circles or adherence to restricted travel paths in order to avoid obstructions, pillars, machines and other structures during train movement. In some of the known arrangements, attempts have been made to improve the operating characteristics of the trailers with a view to reducing the maintenance costs. In the main, the wheeled vehicles have embodied rather complicated steering mechanisms for a part or all of the supporting wheel assemblies. These arrangements followed the concept of rigidly holding the wheels in their adjusted guiding positions which prevented the wheels from accommodating to the proper turning circles or to compensate for irregularities in the surface over which the vehicle was being moved. As a consequence, side slippage tended to produce a high degree of friction which caused wear of the wheel tread surface. Thus, the cost of maintenance was increased, rather than decreased.

In the prevent invention, the difficulties and disadvantages of the presently known trailer vehicles has been overcome by providing unique steering means wherein all the supporting castors are guidingly steered in a controlled and positive manner in response to the lateral swinging movements of a pulling tongue of the vehicle, yet are resiliently maintained in their guiding positions in such a manner as to permit limited or slight accommodating movements with respect to the guiding positions of the wheels. This enables automatic adjustment of each castor or wheel to the proper straight line or curved path of movement, as well as automatic compensation for variations in the surface along the path of movement. Slippage and friction are thus minimized and the maintenance costs materially reduced.

SUMMARY OF THE INVENTION

The present invention relates generally to wheel supported trailer type vehicles, and is more particularly concerned with improvements in the steering mechanism for such vehicles.

One object of the herein described invention is to provide a steerable wheeled trailer vehicle of the type adapted to be coupled into a trackless train, which is of simple construction and can be economically produced, and in which maintenance costs will be materially minimized.

A further object is to provide a unique steering mechanism for a trailer vehicle, wherein all of the supporting wheels are independently supported for guiding movements, and in which the wheel assemblies are guidingly moved in response to lateral guiding movements of a pulling tongue of the vehicle.

Another object resides in the provision of a wheeled trailer vehicle according to the preceding object, wherein a unique lever arrangement carried by a pulling vehicle cooperates with a pulling tongue of the trailing vehicle so as to positively actuate its wheel steering mechanism in response to turning movements of the pulling vehicle.

Still another object is to provide an improved steering mechanism for the wheels of a trailer vehicle in which the wheels are guidingly moved to their respective guiding positions, the wheels being resiliently guidingly maintained at the guiding positions, but are independently slightly adjustable in their orientation so as to accommodate to the turning circle, as well as compensate for irregularities which may occur in the wheel supporting surface.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanyings, which are for illustrative purposes only:

FIG. 4 is a plan view showing the guiding mechanism for a four-wheel trailer vehicle according to the present invention, portions being cut away to disclose details of construction;

FIG. 5 is a fragmentary elevational view in section, taken substantially on line 5—5 of FIG. 4 to show details of the guiding connection with a forward wheel assembly of the vehicle; and FIG. 6 is a plan view of a four-wheeled trailer having a modified guiding mechanism according to the present invention.

DESCRIPTION OF THE SEVERAL EMBODIMENTS OF THE INVENTION

Figure 1:
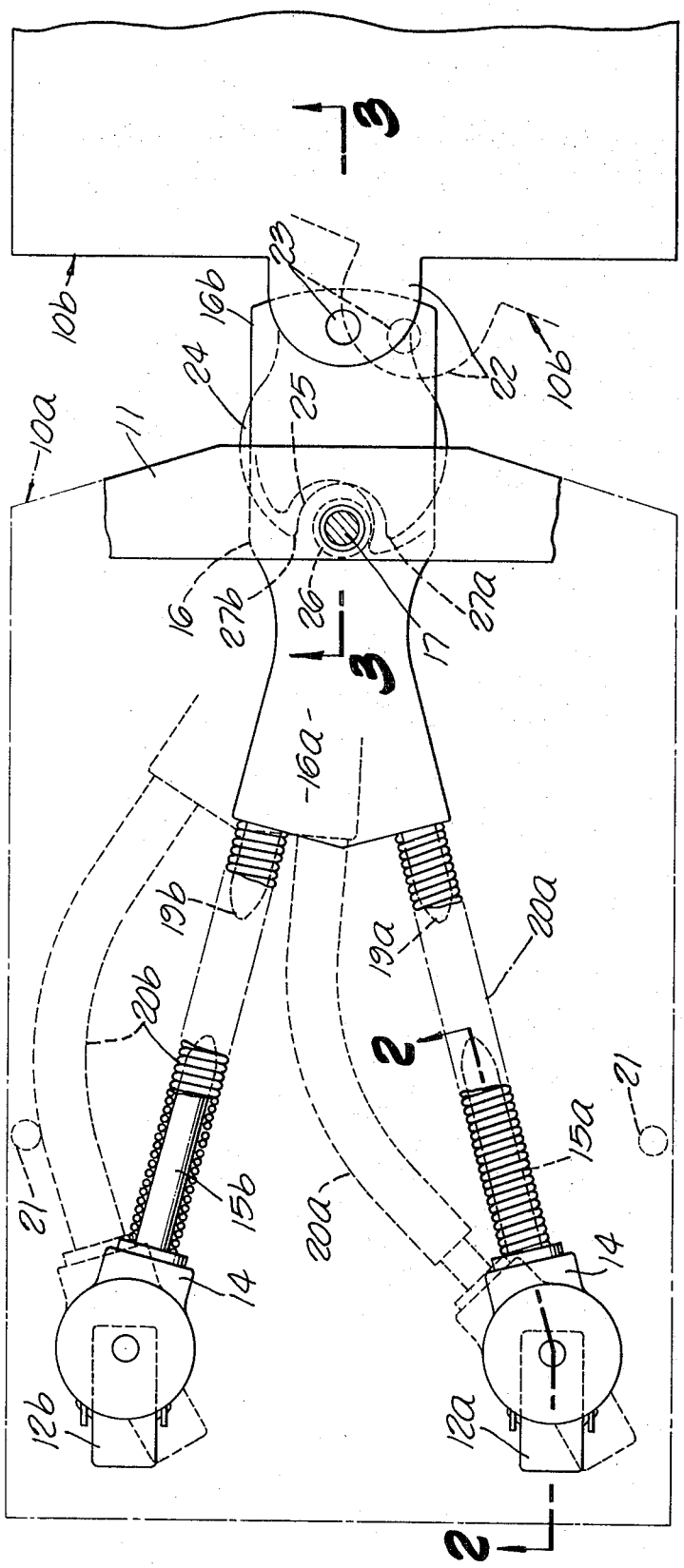
FIG. 1 is a top plan view showing a two-wheeled trailer vehicle having a guiding mechanism according to the present invention, coupled to a towing vehicle.

For illustrative purposes, there is disclosed in FIG. 1 a trailer vehicle 10a and a pulling vehicle 10b which are coupled together in tandem relation so as to form components of a trackless train such as might be utilized for industrial purposes.

The trailer vehicle as shown in FIG. 1 is of the two-wheeled or castor type which basically comprises a platform 11 of generally rectangular configuration with rear castors 12a and 12b, each being supported upon a conventional frame mounting 13 which permits the castor to swivel about a vertical axis. Each castor frame supporting structure is provided with a forwardly projecting bracket arm 14 which respectively supports pin extensions 15a and 15b.

At the forward end of the platform 11 there is centrally positioned a pulling tongue 16, this tongue being pivoted between its ends on a pivot pin 17 for lateral swinging movements. A spacer element 18 is interposed between the platform and tongue to provide tongue clearance during swinging movements.

A rear end 16a of the tongue is provided with rearwardly diverging spaced apart pin extensions 19a and 19b which are respectively aligned with the pin extensions 15a and 15b, when the castors 12a and 12b are oriented in a fore-and-aft guiding position with respect to the platform 11. The rear end of the tongue is respectively connected with the rear castors by means of tightly coiled spring members 20a and 20b, these springs having their forward ends respectively extending over the pins 19a and 19b while the opposite ends of the springs slidably extend over the pins 15a and 15b.

The springs 20a and 20b form flexible connections between the tongue and the frame mountings of the castor assemblies, such that the tongue and castors will be resiliently retained in a fore-and-aft guiding position for directing movement of the vehicle along a straight line axis of movement. However, if the pulling tongue is laterally swung to one side or the other in making a turning movement, the castors will be properly oriented so as to assume a turning circle compatible with that indicated by the pulling tongue. For example, if the forwards end 16b of the tongue is swung in a clockwise direction, the rear end 16a of the tongue will move to a position, for example, as shown in dashed lines, so as to swing the castors in a counter-clockwise direction to a guiding position as shown in dashed lines. During this movement, the springs 20a and 20b will assume a bowed position, and the end of the spring 20a at the pin 15a will slidingly move along its associated pin. Preferably, the guiding movement, as just explained, is limited by engagement of the spring 20b against the stop pin 21. In swinging the forward end 16b of the tongue in a counter-clockwise direction, the springs 20a and 20b will be bowed in an opposite direction until the spring 20a engages its associated stop pin 21.

While the castors 12a and 12b are oriented as described above into appropriate guiding positions, it is a feature of the present invention that the castors are not rigidly held in the guiding positions. Due to the utilization of the flexible connections provided by the springs 20a and 20b, the castors at their respective guiding positions can resiliently accommodate independently to their proper turning circle, and may further orient to compensate for irregularities in the surface over which the vehicle is being pulled. Thus, side slippage and friction is substantially eliminated and tread wear reduced to a minimum.

Figure 3:
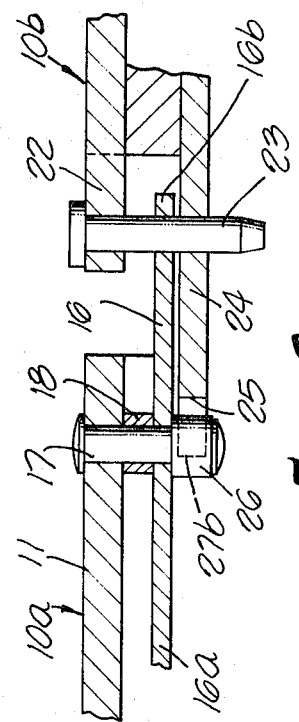
FIG. 3 is a fragmentary elevational view in section showing details of the coupling to the pulling vehicle, taken substantially on line 3—3 of FIG. 1.
Figure 2:
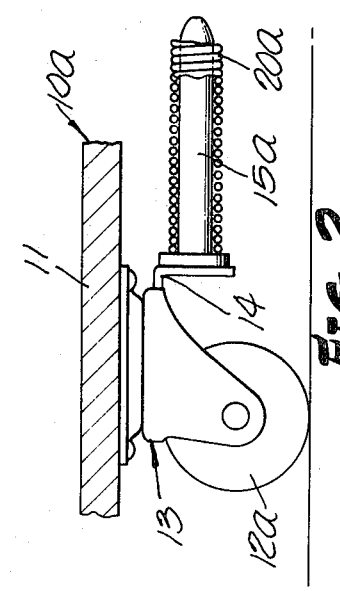
FIG. 2 is a fragmentary sectional view of a wheel assembly, taken substantially on line 2—2 of FIG. 1.

In the order to secure positive control of the castors, it has been found that means must be provided to positively swing the pulling tongue during guiding movements of the pulling vehicle. As shown in FIGS. 1 and 3, the pulling vehicle is provided with a short drawbar 22 which is pivotally coupled with the forward end 16b of the tongue by means of a coupling pin 23. The pulling vehicle is also provided with a rearwardly projecting fixed arm 24 which is positioned below the drawbar 22 and extends beyond the end of the drawbar, the projecting end of this arm being formed with an arcuate end recess 25 adapted to receive therein a sleeve 26 carried by the pivot pin 17. The recess provides spaced fingers 27a and 27b which normally are positioned on opposite sides of the sleeve but are adapted to engage or fulcrum on the sleeve upon predetermined swing movement of the pulling vehicle during a turning movement. Upon engagement of one of these fingers or the other, the arm 24 forms a lever which fulcrums on the sleeve 26 and swings generally about the pivot 17 to provide a positive force against the forward end 16b of the pulling tongue and causes it to swing in a proper guiding direction to effect guiding orientation of the castors at the rear end of the trailer vehicle.

In the case of a four-wheeled or castor type trailer, as shown in FIG. 4, the platform 11 is provided at its forward corners with castors 28a and 28b. The pulling tongue 16 is in this case substantially twice the length of the tongue as utilized in the two-wheel or castor type trailer. In the four-wheel type, the rear castors 12a and 12b operate in the same manner as previously described in connection with the arrangement shown in FIG. 1, however, mechanism must be provided for swinging the forward castors in an opposite direction from that of the rear castors. Accordingly, each forward castor is provided with a rearwardly projecting bracket 29 as shown in FIG. 5. Each of these brackets terminates in a V-notch 30 with outwardly diverging fingers 31a and 31b in each case. Operatively associated with the foreward castors is a crossbar structure 32 which is shown as being formed of upper and lower members 32a and 32b of similar configuration. The crossbar structure 32 is pivoted intermediate its ends on the tongue by a pivot pin 33 positioned rearwardly of the tongue pivot pin 17. The outer ends of the crossbar structure respectively carry a pin or pivot 34 which serves as a support for a sleeve member 35 adapted to seat in the associated adjacent notch 30. It is desirable that there be a slight play or movement between the sleeve and the notch fingers in order that the castor may have a slight accommodating swivel motion at each guiding position. This may be accomplished either by providing a sleeve of resilient material arranged to be engaged by the notch fingers or by providing a sleeve of rigid material, in which case the fingers would loosely engage the sleeve.

With the arrangement described above, the forward castors as well as the rear castors will be moved into their guiding positions in response to swinging movements of the tongue 16 about its pivot 17 as previously described. For example, if the tongue 16 is swung in a clockwise direction, the forward castors will be swung in a clockwise direction as the result of the operation of the crossbar structure 32, whereas the rear castors will be swung in an opposite counterclockwise direction. The pulling vehicle would be in this case connected to the forward end 16b of the tongue in the same manner as described in connection with the two-wheeled trailer type as shown in FIG. 1, and would effect guiding movements in the same manner as described for the two-wheeled or two-castor trailer.

A modified four-wheeled trailer type is shown in FIG. 6. In this embodiment, the rear castors are moved to guiding positions in the same manner as in the embodiment as shown in FIG. 4. The modified embodiment, however, differs in that the crossbar structure 32 has been omitted and instead of guidingly moving the forward wheels or castors directly from the tongue movements, these castors are guidingly moved by being connected with the rear castors 12a and 12b. As shown, the brackets 14 of the rear castors are provided with second pin extensions 36a and 36b which are coupled through coiled springs 37a and 37b with pins 38a and 38b carried by the frame mountings of the castors. With this arrangement the castors at each side of the trailer vehicle will be guidingly moved in opposite directions for the same purpose as in the case of the four-wheeled type disclosed in FIG. 4.

From the foregoing descriptions and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. A trailer vehicle for coupling connection with a pulling vehicle of a trackless train, comprising:
   a. a generally rectangular platform;
   b. individually supported wheel assemblies at the rear corners of said platform pivoted for swinging movement on a vertical axis;
   c. a pulling tongue at the forward end of said platform pivoted between its forward end and rear end for lateral swinging movements; and
   d. means interconnecting the rear end of said tongue respectively with each of the wheel assemblies for imparting guiding swinging movements thereto in response to lateral pivotal movements of the forward end of said tongue, said means comprising a resilient member extending between the rear end of said tongue and each of said wheel assemblies.

2. A trailer vehicle according to claim 1, wherein the forward end of the tongue is arranged for pivotal connection with a drawbar of the pulling vehicle, and a fixed arm carried by the pulling vehicle projects rearwardly of said pivotal connection, said arm having an outer end recess for receiving the pulling tongue pivot therein so as to form a fulcrum and enable said arm to act as a lever for swinging the forward end of the tongue in response to turning movements of the pulling vehicle.

3. A trailer-vehicle according to claim 1, in which the resilient member is an elongate spring having one end anchored on the rear end of said tongue and its other end in sliding engagement with the associated wheel assembly.

4. A trailer vehicle according to claim 3, in which the resilient member is a tightly coiled spring with said other end slidably engaged with a wheel assembly guiding member.

5. A trailer vehicle according to claim 4, wherein the guiding member comprises a pin which extends into the spring end.

6. A trailer vehicle according to claim 1, in which the interconnecting means are operative to move the wheel assemblies to guiding positions, and resiliently enables limited independent accommodating movement of the wheel assemblies with respect to their guiding positions.

7. A trailer vehicle according to claim 1, in which the resilient members are engageable with stops for limiting their respective guiding movement deflection in one direction.

8. A trailer vehicle according to claim 1, wherein the wheel assemblies comprise castors.

9. A trailer vehicle according to claim 1, including individually supported wheel assemblies at the forward corners of said platform pivoted for swinging movement on a vertical axis.

10. A trailer vehicle according to claim 9, including connection means for transmitting guiding movements to said wheel assemblies at the forward corners of said platform in response to the lateral pivotal movement of said tongue.

11. A trailer vehicle according to claim 10, wherein the guiding movements of the forward wheel assemblies are in directions opposite to the guiding movements of the rear wheel assemblies.

12. A trailer vehicle according to claim 9, including crossbar means pivoted on said tongue and having guiding connections at its ends with the forward wheel assemblies.

13. A trailer vehicle according to claim 12, in which the guiding connection for each forward wheel assembly comprises a wheel assembly bracket member having an end V-notch engageable with a bushing carried by the associated end of said crossbar.

14. A trailer vehicle according to claim 13, wherein the bushing is of resilient material.

15. A trailer vehicle according to claim 13, wherein the V-notch loosely engages said bushing.

16. A trailer vehicle according to claim 9, wherein the wheel assemblies at the corners of said platform comprise castors.

17. A trailer vehicle according to claim 10, wherein the connection means for the wheel assemblies at the forward corners comprises resilient members coupling the rear wheel assemblies and the forward wheel assemblies.

18. A trailer vehicle according to claim 17, in which the resilient members are coiled springs, each spring having one end connected with a rear wheel assembly and its other end connected with a forward wheel assembly.

19. A trailer vehicle according to claim 18, wherein each spring connects wheel assemblies on the same side of said platform.

* * * * *